United States Patent
Doshita

(10) Patent No.: US 9,484,723 B2
(45) Date of Patent: Nov. 1, 2016

(54) WIRE HARNESS

(75) Inventor: Kenichi Doshita, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/234,575

(22) PCT Filed: Aug. 8, 2012

(86) PCT No.: PCT/JP2012/070270
§ 371 (c)(1),
(2), (4) Date: Jan. 23, 2014

(87) PCT Pub. No.: WO2013/022048
PCT Pub. Date: Feb. 14, 2013

(65) Prior Publication Data
US 2014/0151116 A1    Jun. 5, 2014

(30) Foreign Application Priority Data
Aug. 10, 2011 (JP) .................................. 2011-175129

(51) Int. Cl.
*H02G 3/04* (2006.01)
*H02G 3/06* (2006.01)
(Continued)

(52) U.S. Cl.
CPC ......... *H02G 3/0406* (2013.01); *B60R 16/0215* (2013.01); *F16B 5/0664* (2013.01); *H02G 3/32* (2013.01); *F16B 5/0642* (2013.01); *F16B 11/006* (2013.01)

(58) Field of Classification Search
CPC .......... H02G 3/30; H02G 3/305; H02G 3/32; H02G 3/34; H02G 3/36; H02G 3/38; H02G 3/381; H02G 3/383; H02G 3/385; H02G 3/386; H02G 3/388

USPC ......... 174/40 CC, 68.3, 70 R, 113 R, 117 A; 248/71
See application file for complete search history.

(56) References Cited

U.S. PATENT DOCUMENTS 4,358,081 A * 11/1982 Notoya ........................... 248/73
4,490,886 A *  1/1985 Omata ......................... 248/74.3
(Continued)

FOREIGN PATENT DOCUMENTS

CN    1807954 A    7/2006
JP    7-211150 A    8/1995
(Continued)

OTHER PUBLICATIONS

Machine Translation of Unno (JP 07-211150) provided with Office Action.*

(Continued)

*Primary Examiner* — Chau N Nguyen
*Assistant Examiner* — Roshn Varghese
(74) *Attorney, Agent, or Firm* — Kenealy Vaidya LLP

(57) ABSTRACT

A wire harness (11) includes a one-sided self-adhesive sheet (28) which has a special adhesive layer (23) and is formed with a sheet hole (21), and which is folded at a folded part (25) so that two parts of the adhesive surface (23) are adhered and fixed, electric wires (15) which are sandwiched between the two parts of the special adhesive layer (23) along the folded part (25), and which have two end parts which are derived from the one-sided self-adhesive sheet (28), and a clip (17) which has a base plate (37), from which an elastic locking leg (43) which is inserted into the sheet hole (21) is raised, and which is formed with a regulating edge portion (45) which is sandwiched by the one-sided adhesive sheet (28) along the folded part (25).

4 Claims, 5 Drawing Sheets

(51) Int. Cl.
*H01B 7/00* (2006.01)
*H01B 7/08* (2006.01)
*F16L 3/08* (2006.01)
*F16L 3/12* (2006.01)
*H02G 3/32* (2006.01)
*B60R 16/02* (2006.01)
*F16B 5/06* (2006.01)
*F16B 11/00* (2006.01)

(56) References Cited

U.S. PATENT DOCUMENTS

| | | | | |
|---|---|---|---|---|
| 5,160,812 | A | * | 11/1992 | Takahashi et al. ........... 174/135 |
| 7,312,399 | B2 | | 12/2007 | Girot |
| 2006/0144615 | A1 | * | 7/2006 | Girot ............................ 174/135 |
| 2008/0190544 | A1 | * | 8/2008 | Hopf ............................ 156/73.5 |
| 2013/0292159 | A1 | * | 11/2013 | Gotou ................. H01B 7/0045 174/250 |

FOREIGN PATENT DOCUMENTS

| | | |
|---|---|---|
| JP | 2000-67659 A | 3/2000 |
| JP | 2004-74954 A | 3/2004 |
| JP | 2007-259604 A | 10/2007 |

OTHER PUBLICATIONS

Machine Translation of Furukawa (JP 2007-259604A) provided with Office Action.*
Another Machine Translation of Furukawa (JP 2007-259604A) provided with Office Action.*
English language Written Opinion of the International Search Report for PCT/JP2012/070270 dated Sep. 25, 2012.
International Search Report and Written Opinion of the International Search Report for PCT/JP2012/070270 dated Sep. 25, 2012.
The extended European Search Report for the related European Patent Application No. 12821968.0 dated Feb. 20, 2015.
Chinese Office Action for the related Chinese Patent Application No. 201280039126.9 dated Nov. 4, 2015.

* cited by examiner

WIRE HARNESS

TECHNICAL FIELD

The present invention relates to a wire harness.

BACKGROUND ART

Conventionally, a wire harness fixing structure is proposed (refer to a patent document 1) for which a tape winding operation is not required, offsetting amount can be adjusted to a desire value, operation efficiency can be improved, product quality can be stabilized, product cost can be reduced, and working time can be shortened.

As shown in FIG. 6, the wire harness fixing structure has a locking member (clip) 505 which has an elastic locking leg 503 which is locked to a fixed member 501 such as a vehicle body panel, and a fixing film 507 which holds the locking member 505 and is made of a thermally shrinkable film. As shown in FIG. 7, the fixing film 507 is fixed by being overlapped to itself, and is fixed to a wire harness 509, which includes electric wires, while being thermally shrinked. According to the wire harness fixing structure, because two operations, or the operation of fixing the locking member 505 to the wire harness 509 and the operation of adjusting the offsetting amount between the wire harness 509 and the locking member 505, can be performed together, operation time can be shortened.

CITATION LIST

Patent Documents

Patent document 1: Japan Patent Publication No. 2007-259604

SUMMARY OF INVENTION

Technical Problem

However, for the above-described conventional wire harness fixing structure, after the locking member 505 is attached to the fixing film 507, the locking member 505 may undesirably rotate in an insertion hole which is opened in the fixing film 507. When the wire harness 509 is attached to the fixed member 501 while the locking member 505 rotated relative to a predetermined position, the wire harness 509 may be arranged at an angle other than the predetermined attaching angle, that the wire harness 509 may interfere with other components attached to the vehicle body, and that the wire harness 509 may be damaged.

The present invention is made in view of the above situations, and the object of the present invention is to provide a wire harness for which a clip will not easily rotate relative to a one-sided adhesive sheet, and the interference of electric wires with other components due to dip rotation can be prevented.

Solution to Problems

The above object of the present invention is accomplished by the following constructions.

(1) A wire harness, comprising:

a one-sided adhesive sheet, having an adhesive surface, formed with a sheet hole, and folded at a folded part so that two parts of the adhesive surface are adhered and fixed to each other;

an electric wire, sandwiched between the two parts of the adhesive surface along the folded part, and having two end parts of which derived from the one-sided adhesive sheet; and a clip having a regulating edge portion formed in a base plate on which an elastic locking leg inserted into the sheet hole is raised, wherein the regulating edge portion is sandwiched by the one-sided adhesive sheet along the folded part.

According to the wire harness of the construction of the above (1), when the one-sided adhesive sheet is folded at the folded part while the elastic locking leg is inserted into the sheet hole, the regulating edge portion which the base plate of the clip is formed with is arranged along the folded part. Then, the regulating edge portion which has a predetermined length abuts against the straight folded part of the one-sided adhesive sheet. Thus, the base plate is regulated from rotating around the elastic locking leg as the rotation center, and the clip cannot rotate in the sheet hole. Since the clip will not rotate relative to the one-sided adhesive sheet, the electric wires of the wire harness, which are fixed to a fixed member with the clip, are arranged at a decided position of the vehicle body.

(2) The wire harness according to the above (1), wherein the base plate is formed with at least one pair of the regulating edge portions, and one of the regulating edge portions, which is opposite to the folded part, is abutted against a step part which is formed by bending the one-sided adhesive sheet by a thickness of the base plate.

According to the wire harness of the construction of the above (2), the second regulating edge portion of the base plate whose first regulating edge portion abuts against the folded part is made to abut against the step part of the one-sided adhesive sheet which is formed by being bended opposite to the folded part. Thereby, the clip is sandwiched by the folded part and the step part of the one-sided adhesive sheet to which the pair of regulating edge portions of the base plate is bonded, and is further strongly regulated from rotating in the sheet hole.

The present invention has been briefly described above. Further, details of the invention will become more apparent after embodiments of the invention described below (hereinafter referred to as "embodiments") are read with reference to the accompanying figures.

DESCRIPTION OF EMBODIMENTS

A wire harness according to one embodiment of the present invention is described based on the attached figures in detail as follows.

Figure 1:
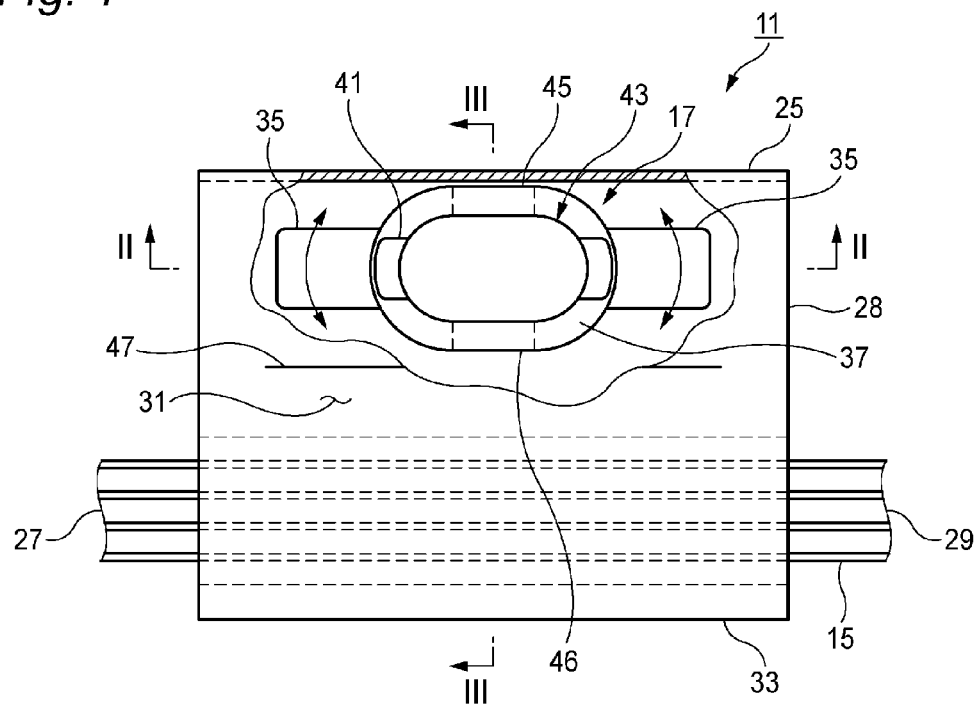
FIG. 1 is a top view of a wire harness according to one embodiment of the present invention.

As shown in FIG. 1, a wire harness 11 according to the present embodiment includes a one-sided self-adhesive sheet 28, electric wires 15 and a clip 17 as main members.

Figure 2:
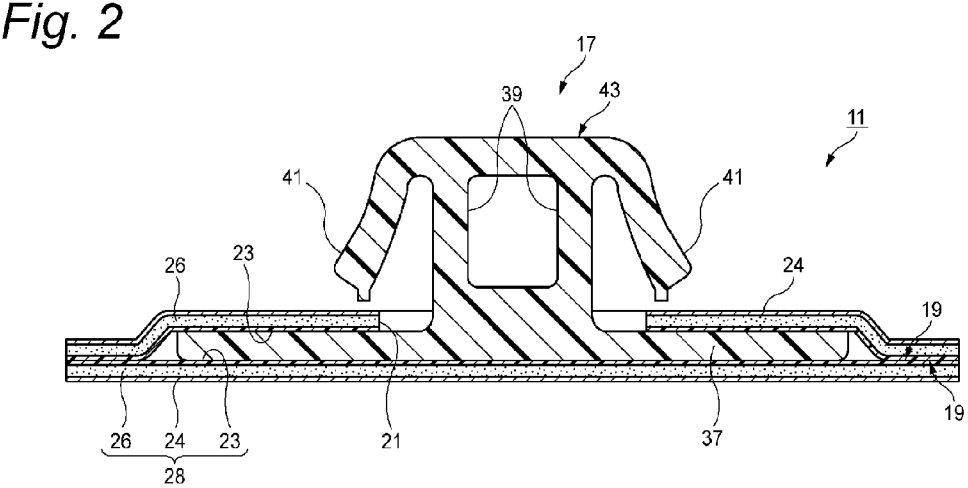
FIG. 2 is an II-II sectional view of the wire harness shown in FIG. 1.
Figure 3:
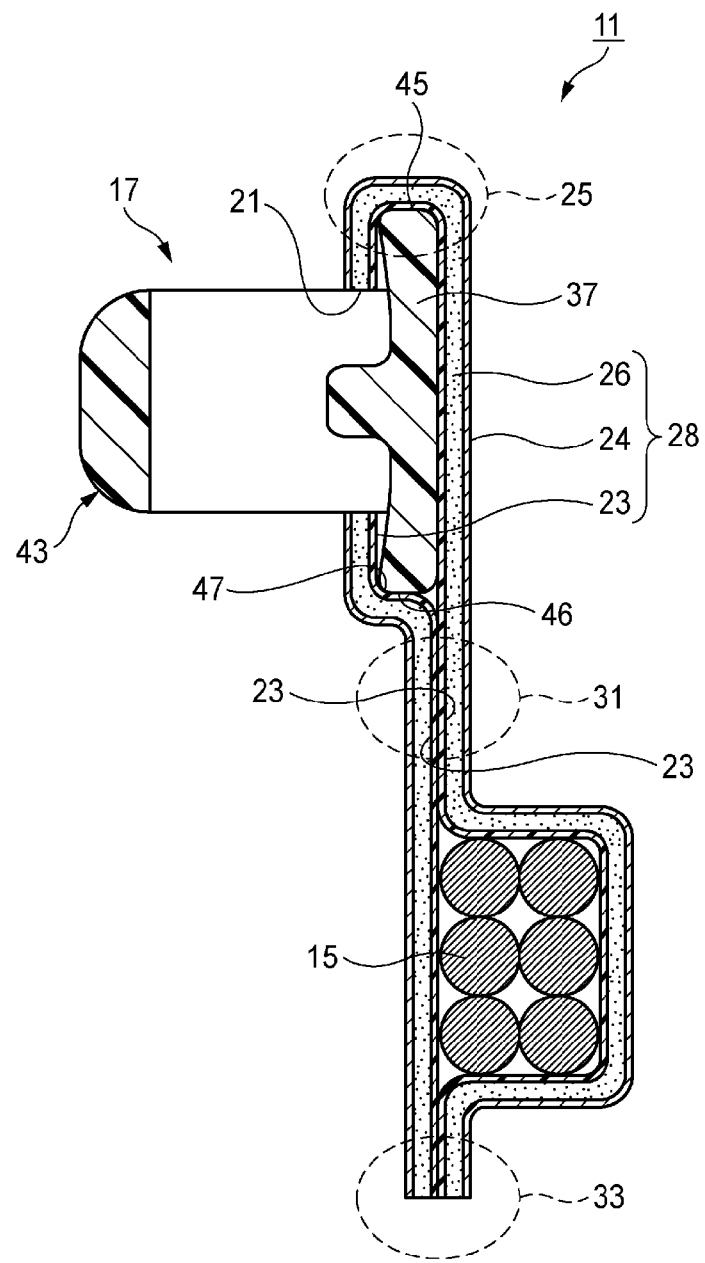
FIG. 3 is an III-III sectional view of the wire harness shown in FIG. 1.

As shown in FIGS. 2 and 3, the one-sided self-adhesive sheet 28, as the one-sided adhesive sheet used in the present embodiment, is a self-adhesive sheet which can be bonded to itself only by combining two parts of its own adhesive surface (inside surface). That is, the self-adhesive sheet may be easily bonded by simply combining two parts of the adhesive surface (inside surface) without paste or a binding tape. Further, the special adhesive layer of the one-sided self-adhesive sheet 28 will not stick to the electric wires 15 or the fingers of an operator, and thus the assembling operativity will not be decreased. In the one-sided self-adhesive sheet 28, a surface material 24 is laminated on the outside surface of a sheet base material 26 made of PP (polypropylene) foams, and a special adhesive layer 23 is laminated on the inside surface of the sheet base material 26. Craft paper, a liner board, a PET (polyethylene terephthalate) film, a PP film, a nonwoven fabric or the like may be used for the surface material 24. The one-sided self-adhesive sheet 28 has properties which are that the tensile strength in the longitudinal direction is 49 N/cm width, and the tensile strength in the transverse direction is 23 N/cm width, (conforming to JIS K-6767), the tear strength in the longitudinal direction is 7.8 N, and the tear strength in the transverse direction is 6.8 N (conforming to JIS K-6767), the water vapor permeability is 0.0052 g/cm$^2$·24 hrs (FS-101B), and the initial adhesion is 2.5 N/cm width (T type peel test). For example, Cro-nel (registered trademark) made by American Blackwell company can be used as the one-sided self-adhesive sheet 28. Not only the above one-sided self-adhesive sheet 28, but also well-known adhesive sheets in which an adhesive layer is laminated on the inside surface of a sheet base material can be used as the one-sided adhesive sheet of the present invention.

The one-sided self-adhesive sheet 28 is cut into a predetermined size, and has a sheet hole 21 shown in FIG. 2. One side 19 of the one-sided self-adhesive sheet 28 becomes the special adhesive layer 23. When the one-sided self-adhesive sheet 28 is folded at a folded part 25 shown in FIG. 3, two parts of the adhesive surface are adhered and fixed. Not only the above one-sided self-adhesive sheet 28, but also well-known adhesive sheets in which an adhesive layer is laminated on the inside surface of a sheet base material can be used as the one-sided adhesive sheet of the present invention.

Coated electric wires in which conductors are insulated and coated are used for the electric wires 15. While a predetermined number of the electric wires 15 are bundled up, an electric wire one end part 27 and an electric wire the other end part 29 (two end parts) are derived from the one-sided self-adhesive sheet 28, and the electric wires 15 are sandwiched and fixed between two parts, which are combined, of the adhesive surface of the one-sided self-adhesive sheet 28 which is folded at the folded part 25. In this case, the one-sided self-adhesive sheet 28 adheres, as shown in FIG. 3, without a gap to comply with the periphery of the electric wires 15 which are bundled up.

Thus, when the one-sided self-adhesive sheet 28 is used, if a sheet middle bonded part 31 and a sheet edge bonded part 33 shown in FIG. 3 are adhered and fixed, the electric wires 15 are closely adhered and fixed without a gap. When a typical one-sided adhesive sheet is used, the adhesive surface adheres to the insulation coatings of the electric wires 15 to adhere and fix the electric wires 15 without a gap.

A connector not shown in the figure, which is connected to a supplementary device carried in a vehicle body is attached to the terminals of these electric wires 15.

As shown in FIGS. 1 to 3, the clip 17 has an elliptical base plate 37 which has convex pieces 35 at two longitudinal ends. In addition, the base plate 37 may be rectangular. A pair of supporting shafts 39 shown in FIG. 2 is raised from one surface of the base plate 37, and a pair of elastic locking pawls 41 is formed at the distal ends of the supporting shafts 39. Thus, an elastic locking leg 43 formed of the supporting shafts 39 and the elastic locking pawls 41 is vertically provided at one surface of the base plate 37 and is inserted through the sheet hole 21 of the one-sided self-adhesive sheet 28.

As shown in FIG. 1, the base plate 37 is formed with a regulating edge portion 45. The regulating edge portion 45 is formed as a straight edge which is parallel to the major axis of the elliptical base plate 37. Although the regulating edge portion 45 is a straight part in the present embodiment, the regulating edge portion 45 may be a concave curved part. For example, when the regulating edge portion 45 is a concave curved part, the two ends of the concave curved part will be equivalent to the regulating edge portion 45 in the present embodiment. As shown in FIGS. 1 to 3, the base plate 37 of the clip 17 is sandwiched by the one-sided self-adhesive sheet 28 when the regulating edge portion 45 is arranged along the folded part 25 of the one-sided self-adhesive sheet 28.

It is preferred that in the clip 17, the base plate 37 is formed with at least one pair of regulating edge portions 45 and 46. In this case, as shown in FIG. 3, the regulating edge portion 46, opposite to the folded part 25, of the clip 17 is made to abut against a step part 47 which is formed by bending the one-sided self-adhesive sheet 28 by the thickness of the base plate 37. When the regulating edge portion 46 opposite to the folded part 25 is fixed to the one-sided self-adhesive sheet 28, the step part 47 abuts against the regulating edge portion 46 and two parts of the special adhesive layer 23 are adhered and fixed at the sheet middle bonded part 31.

It is preferred that the supporting shafts 39 of the elastic locking leg 43 which is inserted into the sheet hole is smaller in diameter than the sheet hole 21 to make it possible to adjust the pitch. In this case, the sheet hole 21 can be an elongated hole in the direction the pitch is adjusted (the longitudinal direction of the electric wires 15). Because the dip 17 is movable relative to the sheet hole 21, fine adjustment of the clip pitch is enabled. However, the sheet hole 21 is basically positioned by being forged integrally with the one-sided self-adhesive sheet 28 when the outer shape of the one-sided self-adhesive sheet 28 is formed. Thereby, the clip is positioned with a precision that is much higher than that with which the clip is attached conventionally by a manual operation.

Then, an operation of the wire harness 11 having the above construction is described. After the clip 17 is attached to the sheet hole 21, the one-sided self-adhesive sheet 28 is folded at the folded part 25 so that the electric wires 15 are sandwiched between two parts of the special adhesive layer 23. Then, the regulating edge portion 45 which the base plate 37 of the dip 17 is formed with is arranged along the folded part 25. Thus, the regulating edge portion 45 which has a predetermined length along the folded part 25 abuts against the straight folded part 25 of the one-sided self-adhesive sheet 28. Thus, the clip 17 cannot rotate in the direction of the arrow in FIG. 1 in the sheet hole 21.

The regulating edge portion 46 opposite to the folded part 25 is made to abut against the step part 47 of the one-sided self-adhesive sheet 28 which is formed by being bended opposite to the folded part 25. Thereby, the clip 17 is sandwiched by the folded part 25 and the step part 47 of the one-sided self-adhesive sheet 28 to which the pair of regulating edge portions 45 and 46 of the base plate 37 is bonded, and is further strongly regulated from rotating in the sheet hole 21. In this case, the step part 47 is fixed strongly by the sheet middle bonded part 31 where two parts of the adhesive surface are adhered to each other. Even in the area around the clip 17 except the pair of regulating edge portions 45 and 46, the special adhesive layer 23 is closely adhered to itself without a gap so that the clip 17 cannot rotate easily.

The electric wires 15 are arranged at the side of the sheet middle bonded part 31 opposite to the clip 17. The area around the electric wires 15 is sandwiched between two parts of the special adhesive layer 23 of the one-sided self-adhesive sheet 28 so that the electric wires 25 cannot move easily. Thus, for the wire harness 11 according to the present embodiment, when the one-sided self-adhesive sheet 28 is folded at the folded part 25 while the elastic locking leg 43 is inserted into the sheet hole 21, the regulating edge portion 45 which the base plate 37 of the clip 17 is formed with is arranged along the folded part 25. Then, the regulating edge portion 45 having a predetermined length abuts against the folded part 25 of the one-sided self-adhesive sheet 28. Thus, the base plate 37 is regulated from rotating around the elastic locking leg 43 as the rotation center, and the clip 17 cannot rotate in the sheet hole 21. Since the clip 17 will not rotate relative to the one-sided self-adhesive sheet 28, the electric wires 15 of the wire harness 11, which are fixed to a fixed member with the clip 17, are arranged at a decided position of the vehicle body.

For the wire harness 11 of the present embodiment, the second regulating edge portion 46 of the base plate 37 whose first regulating edge portion 45 abuts against the folded part 25 is made to abut against the step part 47 of the one-sided self-adhesive sheet 28 which is formed by being bended opposite to the folded part 25. Thereby, the clip 17 is sandwiched by the folded part 25 and the step part 47 of the one-sided self-adhesive sheet 28 to which the pair of regulating edge portions 45 and 46 of the base plate 37 is bonded, and is further strongly regulated from rotating in the sheet hole 21.

Figure 4:
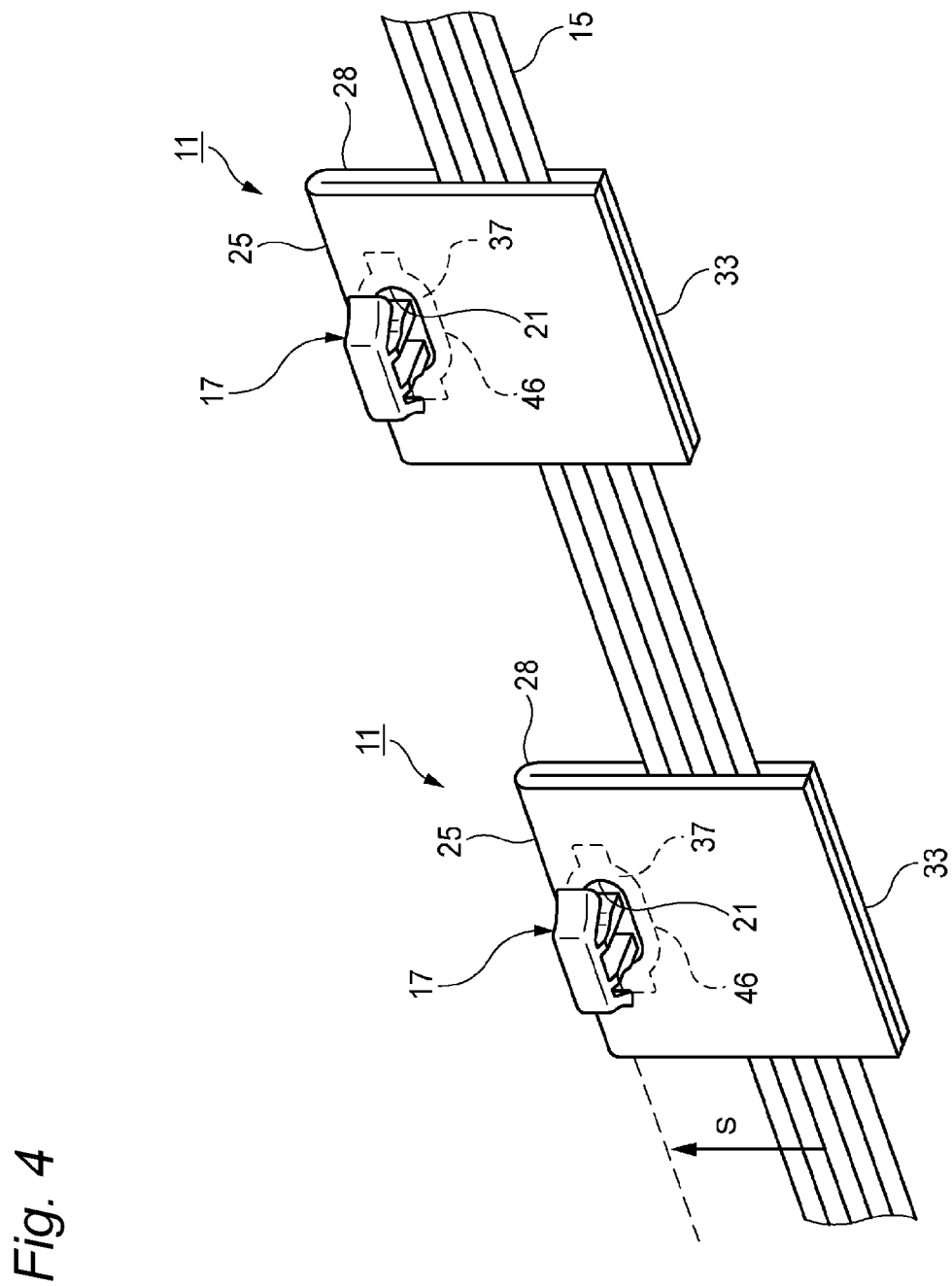
FIG. 4 is a perspective view which shows that the one-sided adhesive sheet shown in FIG. 1 is attached.

FIG. 4 is a perspective view which shows that the one-sided self-adhesive sheets 28 in the above described wire harness 11 are attached.

In the above described wire harness 11, as shown in FIG. 4, the electric wires 15 are bundled and held with a plurality of the one-sided self-adhesive sheets 28 which are disposed with a predetermined distance, and the clips 17 are respectively attached to the one-sided self-adhesive sheets 28. In this way, even if the clips 17 are attached to positions which are only offset a distance S from the central axis of the electric wires 15, there is no fear that the clips rotate undesirably. Thus, in the wire harness 11 which is fixed to a fixed member with the clips 17, the electric wires 15 can be properly arranged to decided positions of the vehicle body. The attaching way is effective particularly when there is a limit to the consumption of the one-sided self-adhesive sheet 28, which is expensive.

Figure 5:
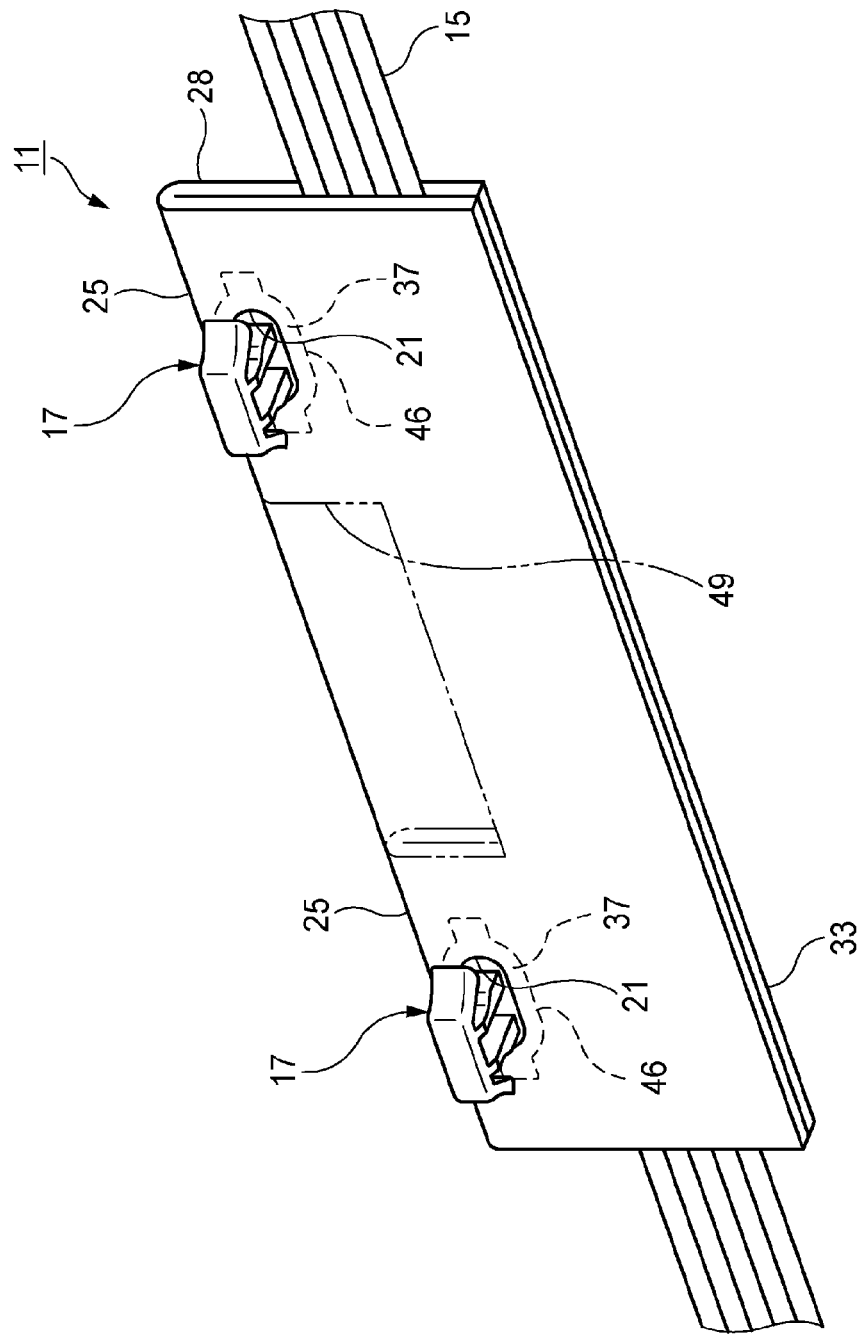
FIG. 5 is a perspective view which shows a variation of the wire harness shown in FIG. 4.
Figure 6:
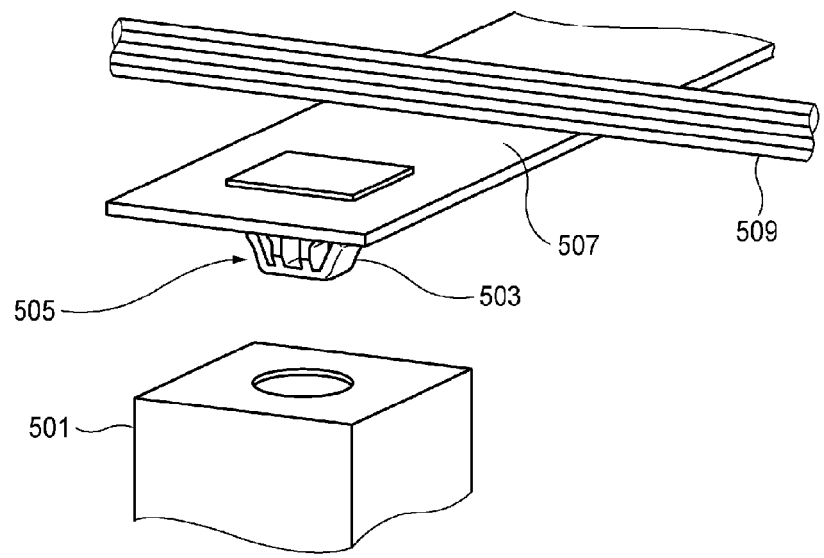
FIG. 6 is a perspective view which shows a conventional wire harness fixing structure before a fixing film is fixed to electric wires.
Figure 7:
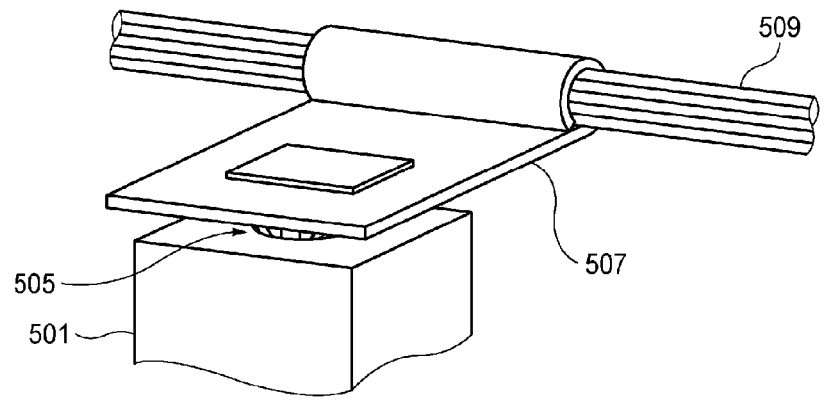
FIG. 7 is a perspective view which shows the conventional wire harness fixing structure in which the electric wires fixed by the fixing film is fixed to a fixed member with a locking member.

As shown in FIG. 5, a plurality of clips 17 can be attached to a one-sided self-adhesive sheet 28 of a big size. The part (the part shown with the two dots dashed lines in FIG. 5), which is not directly related to the holding of the electric wires 15, of the one-sided self-adhesive sheet 28 can be cut out as a removed part 49 to reduce the weight.

Therefore, because the wire harness 11 according to the present embodiment is arranged to a predetermined position of the vehicle body while the clips 17 will not easily rotate relative to the one-sided self-adhesive sheet 28, the interference of the electric wires 15 with other components which are attached to the vehicle body can be prevented.

The features of the wire harnesses of the embodiments according to the present invention described above are briefly, collectively listed in the following (i) to (ii), respectively.

[i] The wire harness 11 comprises:
the one-sided adhesive sheet (one-sided self-adhesive sheet) 28, having the adhesive surface 23, formed with the sheet hole 21, and folded at the folded part 25 so that two parts of the adhesive surface 23 are adhered and fixed to each other;
the electric wire 15, sandwiched between the two parts of the adhesive surface 23 along the folded part 25, and having the two end parts 27 and 29 of which derived from the one-sided adhesive sheet (one-sided self-adhesive sheet) 28; and
the clip 17 having the regulating edge portion 45 formed in the base plate 37 on which the elastic locking leg 43 inserted into the sheet hole 21 is raised, wherein the regulating edge portion 45 which is sandwiched by the one-sided adhesive sheet (one-sided self-adhesive sheet) 28 along the folded part 25.

[ii] The wire harness 11 as recorded in the above [i], wherein
the base plate 37 is formed with at least one pair of the regulating edge portions 45 and 46, and
the regulating edge portion 46, which is opposite to the folded part 25, is abutted against the step part 47 which is formed by bending the one-sided adhesive sheet (one-sided self-adhesive sheet) 28 by the thickness of the base plate 37.

The wire harness of the present invention is described above in detail with reference to the specific embodiments, but the invention is not limited to the previously described embodiments, and besides, it is apparent that various modifications to the present invention can be made without changing the purpose of the present invention.

This application is based on the Japanese patent application (patent application 2011-175129) filed on Aug. 10, 2011, whose content is incorporated herein by reference.

INDUSTRIAL APPLICABILITY

Because the wire harness based on the present invention is wired to a predetermined position of the vehicle body while the dips will not easily rotate relative to the one-sided adhesive sheet, the interference of the electric wires with other components which are attached to the vehicle body can be prevented.

REFERENCE SIGNS LIST 11 wire harness
15 electric wire
17 clip
19 one side
21 sheet hole 23 special adhesive layer (adhesive surface)
25 folded part
27 electric wire one end part (two end part)
28 one-sided self-adhesive sheet (one-sided adhesive sheet)
29 electric wire the other end part (two end part)
37 base plate
43 elastic locking leg
45 regulating edge portion
46 regulating edge portion
47 step part

The invention claimed is:

1. A wire harness, comprising:
a one-sided adhesive sheet having a first terminating edge, a second terminating edge, an adhesive surface extending from the first terminating edge to the second terminating edge, a sheet hole, and a folded part so that two parts of the adhesive surface adhere and fix to each other with the first terminating edge in alignment with the second terminating edge to define a sheet edge bonded part;
an electric wire, sandwiched between the two parts of the adhesive surface along the folded part, and having two end parts of which derived from the one-sided adhesive sheet; and
a clip having a regulating edge portion in a base plate on which an elastic locking leg inserted into the sheet hole is raised, and the clip having a pair of convex pieces which protrude from a respective end of the base plate and extend parallel to the base plate, wherein the regulating edge portion is sandwiched by the one-sided adhesive sheet along the folded part and abuts against the folded part, wherein
the base plate is formed with an opposite regulating edge portion, and
the opposite regulating edge portion, which is opposite to the folded part, is abutted against a step part which is defined by a bend in the one-sided adhesive sheet that extends along a thickness of the base plate, and wherein
the regulating edge portion and the opposite regulating edge portion are located between the pair of convex pieces, and
the one sided adhesive sheet encloses each of the convex pieces therein.

2. The wire harness according to claim 1, wherein the regulating edge portion is secured by the folded part so as to prevent rotation of the folded part.

3. The wire harness according to claim 1, wherein the opposite regulating edge portion is secured by the step part so as to prevent rotation of the folded part.

4. The wire harness according to claim 1, wherein the electric wire and the clip are separated by a sheet middle bonded portion where the one-sided adhesive sheet folds over itself and the two parts adhere and fix together without a gap.

* * * * *